United States Patent
Gowan (10) Patent No.: US 11,411,843 B2
(45) Date of Patent: Aug. 9, 2022

(54) METHOD AND SYSTEM FOR PACKET INSPECTION IN VIRTUAL NETWORK SERVICE CHAINS

(71) Applicant: Verizon Patent and Licensing Inc., Arlington, VA (US)

(72) Inventor: Timothy A. Gowan, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 48 days.

(21) Appl. No.: 16/540,238

(22) Filed: Aug. 14, 2019

(65) Prior Publication Data

US 2021/0051083 A1    Feb. 18, 2021

(51) Int. Cl.
*H04L 43/028*    (2022.01)
*G06F 9/455*    (2018.01)
*H04L 12/46*    (2006.01)

(52) U.S. Cl.
CPC ........ *H04L 43/028* (2013.01); *G06F 9/45558* (2013.01); *H04L 12/4641* (2013.01); *G06F 2009/45595* (2013.01)

(58) Field of Classification Search
CPC . H04L 43/028; H04L 12/4641; H04L 67/327; H04L 29/0653; H04L 29/06591; H04L 29/06598; H04L 29/06619; H04L 29/06986; H04L 45/38; H04L 63/20; H04L 67/10; H04L 43/08; H04L 45/64; H04L 47/20; H04L 47/2441; H04L 63/1408; H04L 63/1425; H04L 63/205; H04L 69/22; H04L 12/4633; H04L 41/00; H04L 41/0609; H04L 41/0631; H04L 41/0672; H04L 41/0806; H04L 41/22; H04L 41/28; H04L 41/5009; H04L 41/5019; H04L 41/5054; H04L 41/5074; H04L 43/045; H04L 43/067; H04L 43/10; H04L 45/02; H04L 45/021; H04L 45/306; H04L 45/34; H04L 45/36; H04L 45/54; H04L 47/125; H04L 47/24; H04L 47/2408; H04L 47/2475; H04L 47/2483; H04L 47/25; H04L 49/15; H04L 49/25; H04L 49/70; H04L 49/90; H04L 63/0281; H04L 63/062; H04L 63/08; H04L 63/18; H04L 67/14; H04L 67/148; H04L 67/2814; H04L 67/322; H04L 67/34; H04L 12/1403; H04L 12/1407; H04L 41/0893; H04L 41/5096; H04L 61/25; H04L 61/2514;

(Continued)

(56) References Cited

U.S. PATENT DOCUMENTS

7,826,469 B1 *    11/2010    Li ..................... H04L 47/2441
                                                                    370/412
9,258,742 B1 *    2/2016    Pianigiani ............... H04L 45/38
(Continued)

*Primary Examiner* — Greg C Bengzon (57) ABSTRACT

A method, a device, and a non-transitory storage medium are described in which a packet inspection service is provided. The packet inspection service may enable a virtual entity of multiple virtual entities of a service chain to perform packet inspection on incoming packets and store the packet inspection information in a memory or storage device. The virtual entity may provide a service on the packets using the packet inspection information. The other virtual entities may provide services on the packets also using the packet inspection information without having to perform packet inspection.

20 Claims, 6 Drawing Sheets

(58) Field of Classification Search
CPC ............. H04L 61/6068; H04L 67/1002; G06F 9/45558; G06F 2009/45595; G06F 16/2246; G06F 2009/45562; G06F 21/50; G06F 21/53; G06F 21/552; G06F 21/577
See application file for complete search history.

(56) References Cited

U.S. PATENT DOCUMENTS

| | | | |
|---|---|---|---|
| 9,507,843 B1* | 11/2016 | Madhavarapu | G06F 16/2358 |
| 9,584,371 B2* | 2/2017 | Zhang | H04L 41/12 |
| 9,842,031 B1* | 12/2017 | Kharatishvili | G06F 16/27 |
| 9,973,445 B2* | 5/2018 | Zhang | H04L 49/9068 |
| 10,063,415 B1* | 8/2018 | Kanakarajan | H04L 41/0806 |
| 10,116,553 B1* | 10/2018 | Penno | H04L 45/306 |
| 10,153,978 B1* | 12/2018 | di Proietto | H04L 47/2441 |
| 10,169,023 B2* | 1/2019 | Ciano | G06F 9/455 |
| 10,193,698 B1* | 1/2019 | Das | H04L 9/3268 |
| 10,237,379 B2* | 3/2019 | Kumar | H04L 12/4641 |
| 10,432,528 B2* | 10/2019 | Cortes Gomez | H04L 43/028 |
| 10,637,750 B1* | 4/2020 | Bollineni | H04L 41/5025 |
| 10,826,835 B2* | 11/2020 | Ruckstuhl | H04L 47/2441 |
| 2005/0289244 A1* | 12/2005 | Sahu | H04L 67/2819 709/249 |
| 2007/0180490 A1* | 8/2007 | Renzi | H04L 63/145 726/1 |
| 2013/0103817 A1* | 4/2013 | Koponen | G06F 9/45558 709/223 |
| 2014/0307744 A1* | 10/2014 | Dunbar | H04L 45/38 370/401 |
| 2014/0334295 A1* | 11/2014 | Guichard | H04L 47/2441 370/230 |
| 2014/0334488 A1* | 11/2014 | Guichard | H04L 69/22 370/392 |
| 2015/0063102 A1* | 3/2015 | Mestery | H04L 41/50 370/230 |
| 2015/0092551 A1* | 4/2015 | Moisand | H04L 67/146 370/235 |
| 2015/0092564 A1* | 4/2015 | Aldrin | H04L 41/5038 370/241.1 |
| 2015/0103827 A1* | 4/2015 | Quinn | H04L 49/70 370/392 |
| 2015/0163150 A1* | 6/2015 | Beheshti-Zavareh | H04L 45/02 370/400 |
| 2015/0188949 A1* | 7/2015 | Mahaffey | H04W 12/0027 726/1 |
| 2015/0195197 A1* | 7/2015 | Yong | H04L 45/306 370/392 |
| 2015/0263901 A1* | 9/2015 | Kumar | H04L 45/02 370/254 |
| 2015/0334027 A1* | 11/2015 | Bosch | H04L 47/2408 370/230 |
| 2015/0341271 A1* | 11/2015 | Cortes Gomez | H04L 47/11 370/236 |
| 2015/0381493 A1* | 12/2015 | Bansal | H04L 45/745 370/392 |
| 2016/0006753 A1* | 1/2016 | McDaid | H04W 4/70 726/23 |
| 2016/0028640 A1* | 1/2016 | Zhang | H04L 67/2804 370/389 |
| 2016/0050161 A1* | 2/2016 | Da | H04L 45/00 709/226 |
| 2016/0085577 A1* | 3/2016 | Gray | H04L 49/70 718/1 |
| 2016/0087995 A1* | 3/2016 | Gehrmann | H04L 9/0822 713/156 |
| 2016/0094661 A1* | 3/2016 | Jain | H04L 67/14 709/227 |
| 2016/0112337 A1* | 4/2016 | Zhang | H04L 47/17 370/237 |
| 2016/0119226 A1* | 4/2016 | Guichard | H04L 47/2475 370/392 |
| 2016/0134531 A1* | 5/2016 | Assarpour | H04L 49/309 370/392 |
| 2016/0149774 A1* | 5/2016 | Chastain | G06F 9/45558 370/241 |
| 2016/0205005 A1* | 7/2016 | Lee | H04L 41/5025 709/224 |
| 2016/0205018 A1* | 7/2016 | Li | H04L 45/021 370/392 |
| 2016/0212048 A1* | 7/2016 | Kaempfer | H04L 45/745 |
| 2016/0226913 A1* | 8/2016 | Sood | H04Q 9/00 |
| 2016/0234097 A1* | 8/2016 | Chang | H04L 45/54 |
| 2016/0254998 A1* | 9/2016 | Jokela | H04L 45/745 370/390 |
| 2016/0277293 A1* | 9/2016 | Lopez | H04L 47/20 |
| 2016/0294664 A1* | 10/2016 | Manghirmalani | H04L 43/12 |
| 2016/0330125 A1* | 11/2016 | Mekkattuparamban | H04L 12/4633 |
| 2016/0344803 A1* | 11/2016 | Batz | H04M 15/66 |
| 2016/0371496 A1* | 12/2016 | Sell | G06F 12/14 |
| 2016/0373474 A1* | 12/2016 | Sood | G06F 21/53 |
| 2016/0381175 A1* | 12/2016 | Wu | H04L 67/322 709/240 |
| 2017/0012799 A1* | 1/2017 | Jiang | H04L 45/24 |
| 2017/0019302 A1* | 1/2017 | Lapiotis | H04L 41/145 |
| 2017/0019303 A1* | 1/2017 | Swamy | H04L 41/0893 |
| 2017/0019335 A1* | 1/2017 | Schultz | H04L 47/2475 |
| 2017/0093721 A1* | 3/2017 | Kano | H04L 67/1038 |
| 2017/0094002 A1* | 3/2017 | Kumar | H04L 67/2861 |
| 2017/0104679 A1* | 4/2017 | Sunavala | H04L 45/306 |
| 2017/0111267 A1* | 4/2017 | Lin | H04L 47/2483 |
| 2017/0126503 A1* | 5/2017 | Tsubouchi | H04L 45/04 |
| 2017/0126792 A1* | 5/2017 | Halpern | G06F 9/5061 |
| 2017/0163531 A1* | 6/2017 | Kumar | H04L 45/00 |
| 2017/0208011 A1* | 7/2017 | Bosch | H04L 47/29 |
| 2017/0251065 A1* | 8/2017 | Furr | H04L 67/16 |
| 2017/0264677 A1* | 9/2017 | Li | H04L 41/50 |
| 2017/0279712 A1* | 9/2017 | Nainar | H04L 45/64 |
| 2017/0299633 A1* | 10/2017 | Pietrowicz | H04L 43/028 |
| 2017/0302470 A1* | 10/2017 | Clark | H04L 41/0893 |
| 2017/0310611 A1* | 10/2017 | Kumar | H04L 67/2842 |
| 2017/0339110 A1* | 11/2017 | Ni | H04W 48/08 |
| 2017/0344298 A1* | 11/2017 | Shih | G06F 9/45558 |
| 2017/0346704 A1* | 11/2017 | Strijkers | G06F 9/45558 |
| 2017/0346752 A1* | 11/2017 | Krishnamurthy | H04L 45/306 |
| 2017/0359252 A1* | 12/2017 | Kumar | H04L 12/4633 |
| 2018/0020016 A1* | 1/2018 | Hu | H04L 63/1458 |
| 2018/0041524 A1* | 2/2018 | Reddy | H04L 63/1408 |
| 2018/0063018 A1* | 3/2018 | Bosch | H04L 45/306 |
| 2018/0098104 A1* | 4/2018 | Duddles | H04N 21/2353 |
| 2018/0101397 A1* | 4/2018 | Sergeev | G06F 9/45558 |
| 2018/0109457 A1* | 4/2018 | Avci | H04L 47/125 |
| 2018/0131723 A1* | 5/2018 | DeLuca | H04L 63/20 |
| 2018/0139154 A1* | 5/2018 | Rajagopal | H04L 41/04 |
| 2018/0198791 A1* | 7/2018 | Desai | H04L 63/0807 |
| 2018/0205659 A1* | 7/2018 | Ni | H04L 45/04 |
| 2018/0227224 A1* | 8/2018 | Bhaskar | H04L 45/38 |
| 2018/0262431 A1* | 9/2018 | Zhang | H04L 67/327 |
| 2018/0262443 A1* | 9/2018 | Zhang | H04L 45/306 |
| 2018/0302343 A1* | 10/2018 | Lokman | H04L 45/56 |
| 2018/0309640 A1* | 10/2018 | Nagarajan | H04L 41/0893 |
| 2018/0309675 A1* | 10/2018 | Xu | H04L 12/18 |
| 2019/0007311 A1* | 1/2019 | Omar | H04L 67/34 |
| 2019/0104041 A1* | 4/2019 | Tabak | G06F 3/0482 |
| 2019/0104076 A1* | 4/2019 | Seetharaman | H04L 47/2475 |
| 2019/0109713 A1* | 4/2019 | Clark | H04L 9/3239 |
| 2019/0109714 A1* | 4/2019 | Clark | H04L 9/3226 |
| 2019/0109820 A1* | 4/2019 | Clark | H04L 9/3273 |
| 2019/0109821 A1* | 4/2019 | Clark | H04L 63/0272 |
| 2019/0132221 A1* | 5/2019 | Boutros | H04L 12/4633 |
| 2019/0140947 A1* | 5/2019 | Zhuang | H04L 45/306 |
| 2019/0140950 A1* | 5/2019 | Zhuang | H04L 45/306 |
| 2019/0149546 A1* | 5/2019 | Nizhawan | G06F 21/6218 726/4 |
| 2019/0158997 A1* | 5/2019 | Starsinic | H04L 12/14 |
| 2019/0190746 A1* | 6/2019 | Lee | H04L 41/5006 |
| 2019/0222538 A1* | 7/2019 | Yang | H04L 49/15 |
| 2019/0227852 A1* | 7/2019 | Glassel | G06F 9/5027 |
| 2019/0268384 A1* | 8/2019 | Hu | H04L 63/08 |

(56) References Cited

U.S. PATENT DOCUMENTS

| | | | |
|---|---|---|---|
| 2019/0273718 A1* | 9/2019 | Ahuja | H04L 63/0236 |
| 2019/0286832 A1* | 9/2019 | Szeto | H04W 12/082 |
| 2019/0296976 A1* | 9/2019 | Maes | H04L 41/0859 |
| 2019/0306051 A1* | 10/2019 | Seetharaman | H04L 45/42 |
| 2019/0370054 A1* | 12/2019 | Xia | G06F 9/45558 |
| 2019/0379599 A1* | 12/2019 | Siracusano | H04L 45/38 |
| 2020/0007445 A1* | 1/2020 | Anwer | H04L 45/74 |
| 2020/0007584 A1* | 1/2020 | Dixit | H04L 43/08 |
| 2020/0014763 A1* | 1/2020 | Boon | H04W 76/22 |
| 2020/0021482 A1* | 1/2020 | Lo | H04L 43/067 |
| 2020/0021518 A1* | 1/2020 | Yan | H04L 41/0806 |
| 2020/0028779 A1* | 1/2020 | Ni | H04L 45/745 |
| 2020/0162426 A1* | 5/2020 | Clark | H04L 63/0876 |
| 2020/0162427 A1* | 5/2020 | Clark | G06F 21/606 |
| 2021/0029029 A1* | 1/2021 | Mehmedagic | H04L 63/0218 |
| 2021/0044567 A1* | 2/2021 | Hu | H04L 63/1425 |

\* cited by examiner

METHOD AND SYSTEM FOR PACKET INSPECTION IN VIRTUAL NETWORK SERVICE CHAINS

BACKGROUND

An increasing number of virtual network functions (VNFs) use deep packet inspection (DPI) to perform advanced analysis and processing of packets for a variety of use cases, such as vulnerability exploit detection, policy enforcement, application-aware routing, traffic optimization, or other types of network-related services.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A network service chain may include multiple virtual network functions in which traffic output from a virtual network function is input to another virtual network function of the service chain. Each of the virtual network functions may perform deep packet inspection to provide their configured function or service. However, each performance of deep packet inspection is time consuming and resource intensive in which each packet is read, data is stored, and the data is processed. This process may involve the use of various hardware resources (e.g., a processor, a memory, a storage, communication interface, etc.), virtualization elements (e.g., a hypervisor, a container, etc.), and other elements (e.g., an operating system, etc.). Regardless of the virtualization architecture used, such as a hypervisor-based architecture or a container-based architecture, repeated deep packet inspection operations performed by each virtual network function of the service chain, for each packet, results in inefficient use of resources (e.g., physical, virtual, logical) used by each virtual network function.

According to exemplary embodiments, a packet inspection service is provided. According to an exemplary embodiment, the packet inspection service is provided in a network service chain. According to an exemplary embodiment, the packet inspection service may be implemented on a host device that includes a virtualization system (referred to as a virtual network device). The virtual network device may host multiple virtual network functions of the network service chain. The virtual network device may be implemented as a hypervisor-based system (e.g., bare-metal hypervisor, hosted hypervisor, etc.), a container-based system, or another type of virtualization system (e.g., proprietary, hybrid, etc.). According to an exemplary embodiment, the packet inspection service includes deep packet inspection in which a payload of a packet is inspected. According to other exemplary embodiments, the packet inspection service includes deep content inspection in which multiple packets may be analyzed to detect an application-layer object, and/or another type of packet inspection.

According to an exemplary embodiment, the packet inspection service designates a primary packet inspection agent and one or multiple secondary packet inspection agents of the network service chain. According to an exemplary embodiment, the primary packet inspection agent performs packet inspection on incoming packets, and stores packet inspection data resulting from the packet inspection in a memory or storage device that is shared with the secondary packet inspection agent. According to an exemplary embodiment, the primary packet inspection agent has write and read permissions pertaining to the packet inspection data, while the secondary packet inspection agent has read permission and not write permission pertaining to the packet inspection data. According to an exemplary embodiment, the secondary primary agent may provide a configured service on a processed packet from the primary packet inspection agent or another secondary primary agent based on the packet inspection data.

According to an exemplary embodiment, the packet inspection service may include allocating more resources to the primary packet inspection agent relative to the secondary packet inspection agent, as described herein. According to an exemplary embodiment, the primary packet inspection agent may obtain packet inspection control data that allows the primary packet inspection agent to store the packet inspection data required by the secondary packet inspection agent in order to provide the configured service.

In view of the foregoing, the packet inspection service may improve resource allocation and/or utilization associated with a network service chain and may improve the time needed to complete the configured services of the network service chain. The packet inspection service may be configured to support various types of network service chains, such as serial or branched configurations, as well as a multi-vendor network service chain that may include multiple proprietary technologies that provide the configured services.

Figure 1:
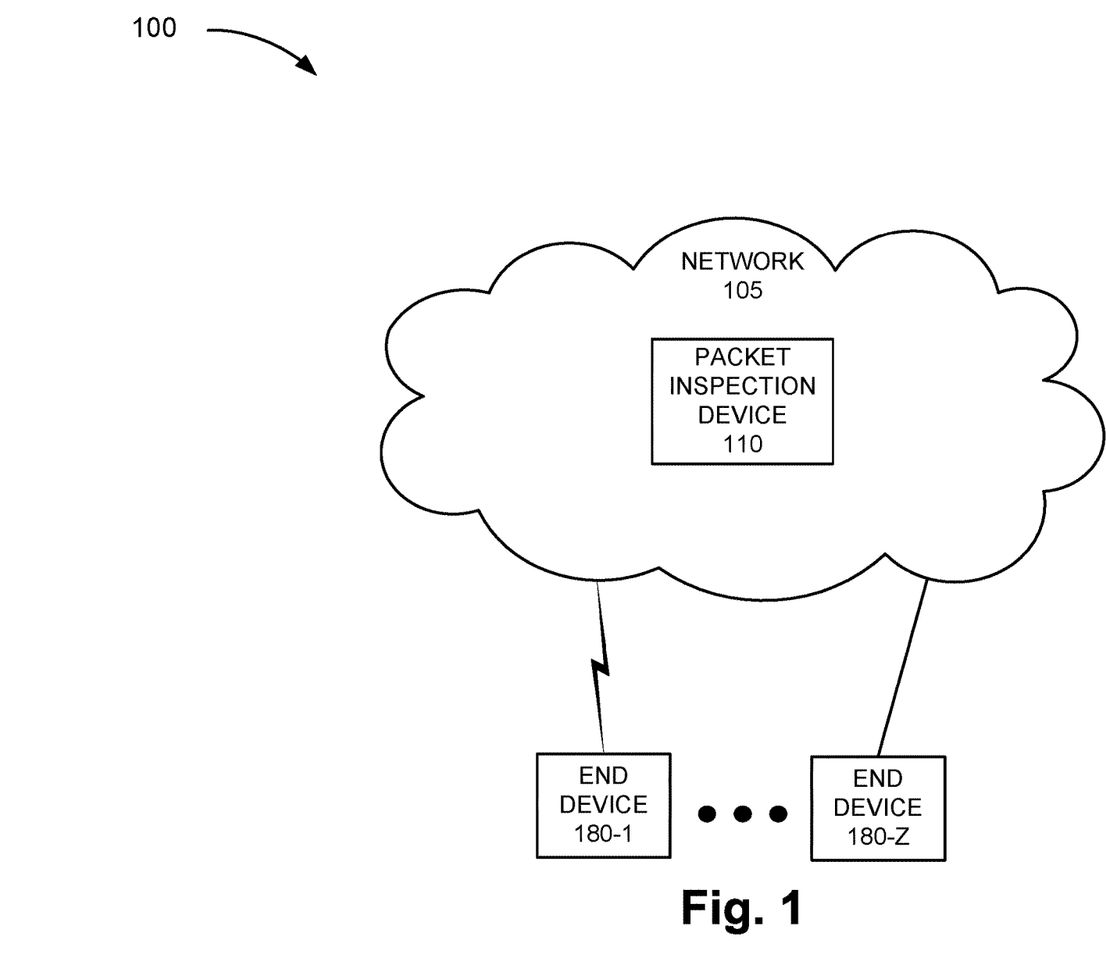
FIG. 1 is a diagram illustrating an exemplary environment in which an exemplary embodiment of a packet inspection service may be implemented.

FIG. 1 is a diagram illustrating an exemplary environment 100 in which an exemplary embodiment of the packet inspection service may be implemented. As illustrated, environment 100 includes a network 105. Network 105 includes a packet inspection device 110. Environment 100 further includes end devices 180-1 through 108-Z (referred to collectively as end devices 180 and individually (or generally) as end device 180).

The number, type, and arrangement of network 105, as illustrated and described herein are exemplary. The number, the type, and the arrangement of packet inspection device 110 and end devices 180, as illustrated and described herein are exemplary.

Environment 100 includes communication links within network 105 and between end devices 180 and network 105. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Network 105 may include one or multiple networks of one or multiple types and technologies. For example, network 105 may include an access network, a core network, a radio access network, an external network, an application service layer network, a back-haul network, a local area network, a metropolitan area network, a wide area network, a data network, the Internet, a public network, a private network, a wireless network, a wired network, an optical network, a mobile network, the World Wide Web (WWW), an Internet Protocol Multimedia Subsystem (IMS) network, a Rich Communication Service (RCS) network, a cloud network, a packet-switched network, a data center, a service provider network, a mobile or multi-access edge computing (MEC) network, a fog network, an Ethernet network, and/or another type of network.

Packet inspection device 110 is a network device that includes logic that provides the packet inspection service, as described herein. According to various exemplary embodiments, packet inspection device 110 may reside in one or multiple networks of network 105. According to an exemplary embodiment, packet inspection device 110 is a virtual network device. According to an exemplary embodiment, the virtual network device may host multiple virtual network functions of a network service chain. According to an exemplary embodiment, the virtual network device includes a primary agent and a secondary agent that provide the packet inspection service. Packet inspection device 110 is described further herein.

End device 180 includes a device that has computational and communication capabilities (e.g., wireless, wired, optical, etc.). End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a global positioning device, a drone, customer premise equipment (CPE) (e.g., a set top box, etc.), a television, a streaming player device, an Internet of Things (IoT) device, or some other type of wireless, wired, and/or optical device. According to various exemplary embodiments, end device 180 may be configured to execute various types of software (e.g., applications, programs, etc.). The number and the types of software may vary among end devices 180. End device 180 may generate and transmit packets via network 105. Additionally, or alternatively, end device 180 may receive packets via network 105.

Figure 2A:
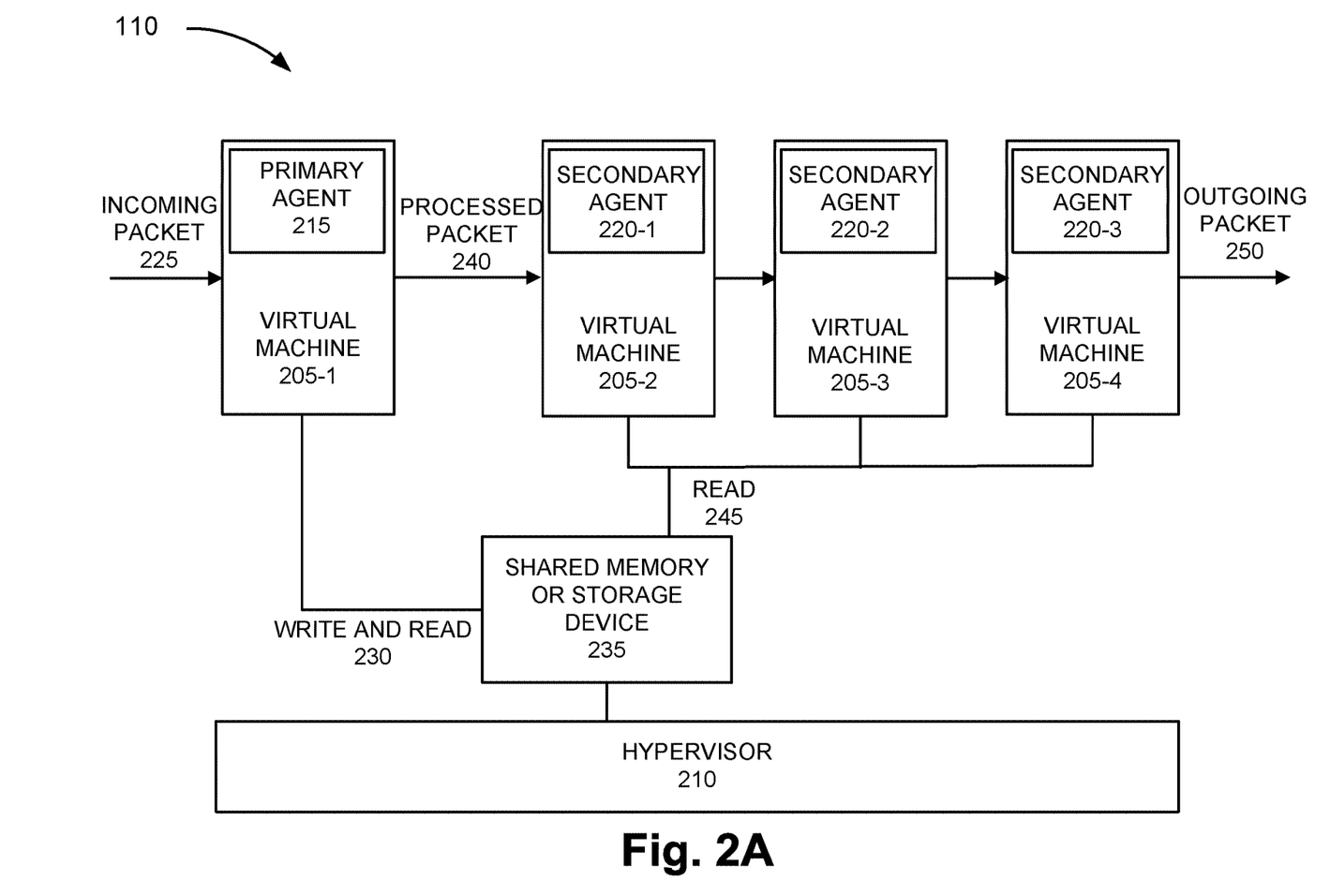
FIG. 2A is a diagram illustrating an exemplary process of an exemplary embodiment of the packet inspection service.
Figure 2B:
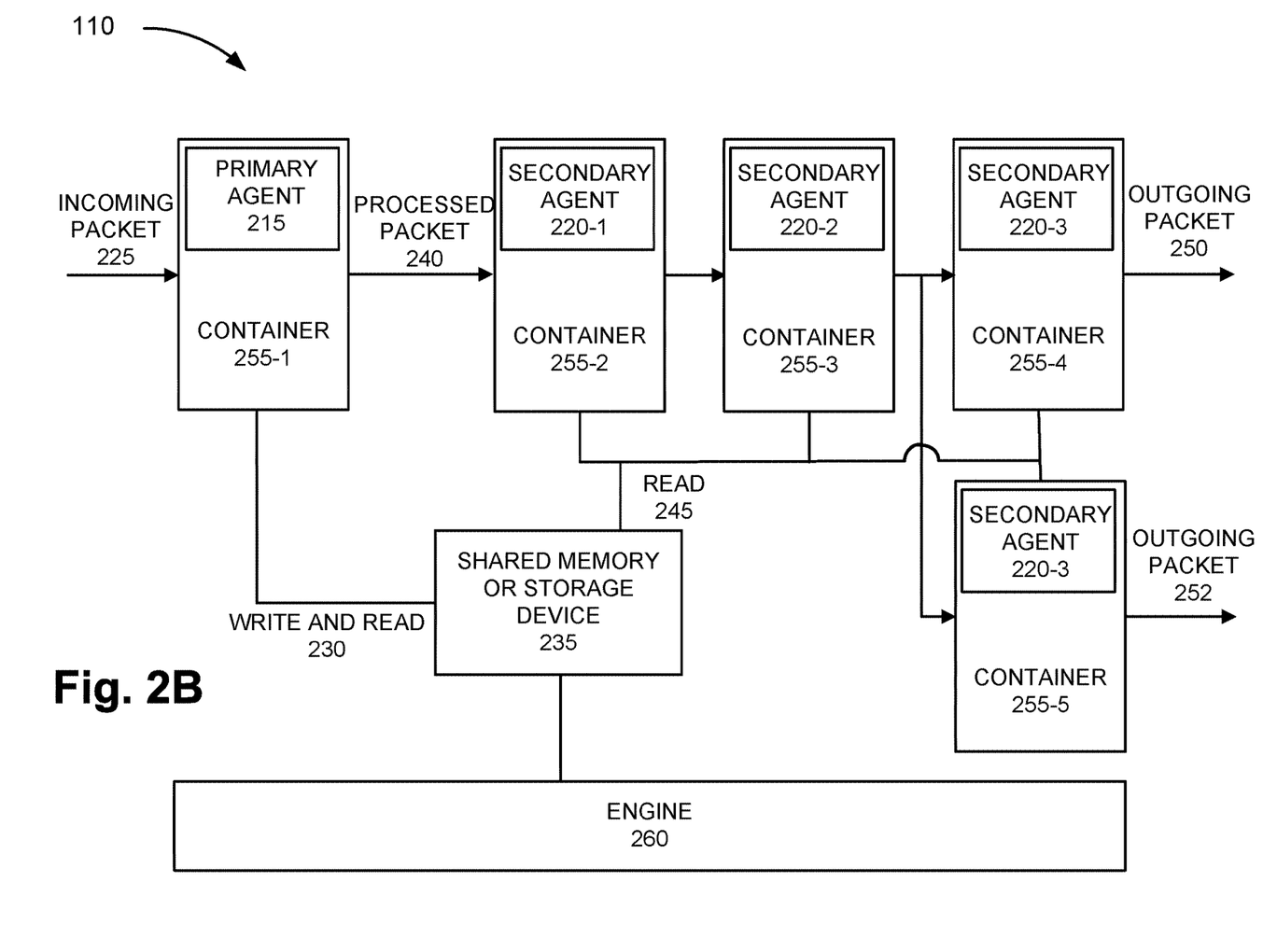
FIG. 2B is a diagram illustrating another exemplary process of an exemplary embodiment of the packet inspection service.

FIGS. 2A and 2B are diagrams illustrating exemplary embodiments of packet inspection device 110. Referring to FIG. 2A, according to an exemplary embodiment, packet inspection device 110 includes virtual machines 205-1 through 205-4 (also referred to as virtual machines 205 and individually or generally as virtual machine 205) and a hypervisor 210. Although not illustrated, virtual machine 205 may include software (e.g., an application or a program) that provides a configured service of the network service chain. For example, the configured service may relate to a cyber-security function, a quality of service function, a protocol streamlining function, an application layer-based function, a content-aware function, a policy enforcement function, or another type of function of the network service chain.

Additionally, although not illustrated, virtual machine 205 may include other elements, such as binaries, libraries, an operating system, or another type of element, layer, or function that supports the operation of virtual machine 205. Virtual machine 205 may include or have access to hardware resources. The hardware resources may include a processor, memory, storage, a communication interface, and/or other types of hardware. The hardware resources may be shared, dedicated, virtualized, logical, and/or another type of configuration.

According to an exemplary embodiment, virtual machines 205 may include agents, as previously described. For example, as illustrated in FIG. 2A, virtual machine 205-1 includes a primary agent 215, and virtual machines 205-2 through 205-4 include secondary agents 220-1 through 220-3 (also referred to as secondary agents 220 and individually or generally as secondary agent 220). Primary agent 215 and secondary agent 220 may include logic that provides the packet inspection service, as described herein.

Primary agent 215 may include logic that receives an incoming packet 225. For example, according to an exemplary scenario, incoming packet 225 may be transmitted by end device 180 and received by packet inspection device 110 via network 105. Primary agent 215 may perform packet inspection, such as deep packet inspection or deep content inspection, on the packet, and generate and/or extract packet inspection information. As illustrated, primary agent 215 may be able to write and read 230 to a shared memory or storage device 235. Primary agent 215 may write the packet inspection information to shared memory or storage device 235. According to various exemplary embodiments, the packet inspection information may include the entire packet or a portion of the packet (e.g., the payload data, etc.). The packet inspection information may include other types of information, such as a packet number (e.g., an identifier, an index number, etc.), strings, and/or metadata. When shared memory or storage device 235 is full, primary agent 215 may overwrite the packet inspection information to a first segment of shared memory or storage device 235. For example, stale packet inspection information may be overwritten.

According to an exemplary embodiment, the packet inspection information includes information that would otherwise be generated and/or extracted from the packet if each of secondary agents 220 had performed the deep packet inspection. In this regard, the packet inspection information may include different types of information. As previously described, primary agent 215 may communicate with secondary agents 220 and obtain logic (e.g., a script, a subroutine, an applet, or other type of code and/or instruction) that enables primary agent 215 to generate and/or extract the packet inspection information on behalf of secondary agent 220.

Primary agent 215 may identify and read packet inspection information that virtual machine 205-1 may use to provide the configured service of the network service chain. Virtual machine 205-1 may output a processed packet 240 to virtual machine 205-2.

In response to receiving processed packet 240, secondary agent 220-1 may identify and read 245 packet inspection information from shared memory or storage device 235. The packet inspection information may pertain to the configured service of virtual machine 205-2. In this way, virtual machine 205-2 may avoid performing its own deep packet inspection procedure. Virtual machine 205-2 may perform the configured service of the network service chain based on the stored packet inspection information, and output a processed packet. This process may continue in a similar manner until an outgoing packet 250 is output from packet inspection device 110, as illustrated. In this way, the remaining virtual machines 205 in the network service chain avoid performing their own deep packet inspection procedure.

Hypervisor 210 (also known as a virtual machine manager (VMM)) includes logic that creates and runs virtual machines 205. Hypervisor 210 may be implemented as a bare-metal hypervisor or a hosted hypervisor. Hypervisor 210 may also allocate a hardware resource, such as shared memory or storage device 235, in support of the packet inspection service. Hypervisor 210 may further support the read and write functionality associated with shared memory or storage device 235 in relation to primary agent 215 and the read functionality associated with secondary agent 220.

Referring to FIG. 2B, according to another exemplary embodiment, packet inspection device 110 includes containers 255-1 through 255-5 (also referred to as containers 255 and individually or generally as container 255) and an engine 260. Containers 255 are arranged to include a branch configuration (in contrast to only a serial configuration). Although not illustrated, container 255 may include software (e.g., an application or a program) that provides a configured service of the network service chain. Additionally, although not illustrated, container 255 may include or have access to other elements, such as an operating system, hardware resources, etc.

The process previously described in relation to FIG. 2A may be similar to the process illustrated in FIG. 2B, in which primary agent 215 performs the packet inspection procedure, writes the packet inspection information to shared memory or storage device 235, and primary agent 215 and secondary agents 220 may use the stored packet inspection information to provide their configured services of the network service chain. In view of the branch configuration, packet inspection device 110 may output outgoing packet 250 and an outgoing packet 252. Engine 260 may include logic that manages containers 255. Engine 260 may also allocate the hardware resource for shared memory or storage device 235, and support the read and write functionality associated with shared memory or storage device 235 in relation to primary agent 215 and the read functionality associated with secondary agent 220. Hypervisor 210 of FIG. 2A and engine 260 are examples of a controller of the virtual entities, such as virtual machines 205 and containers 255.

Figure 3:
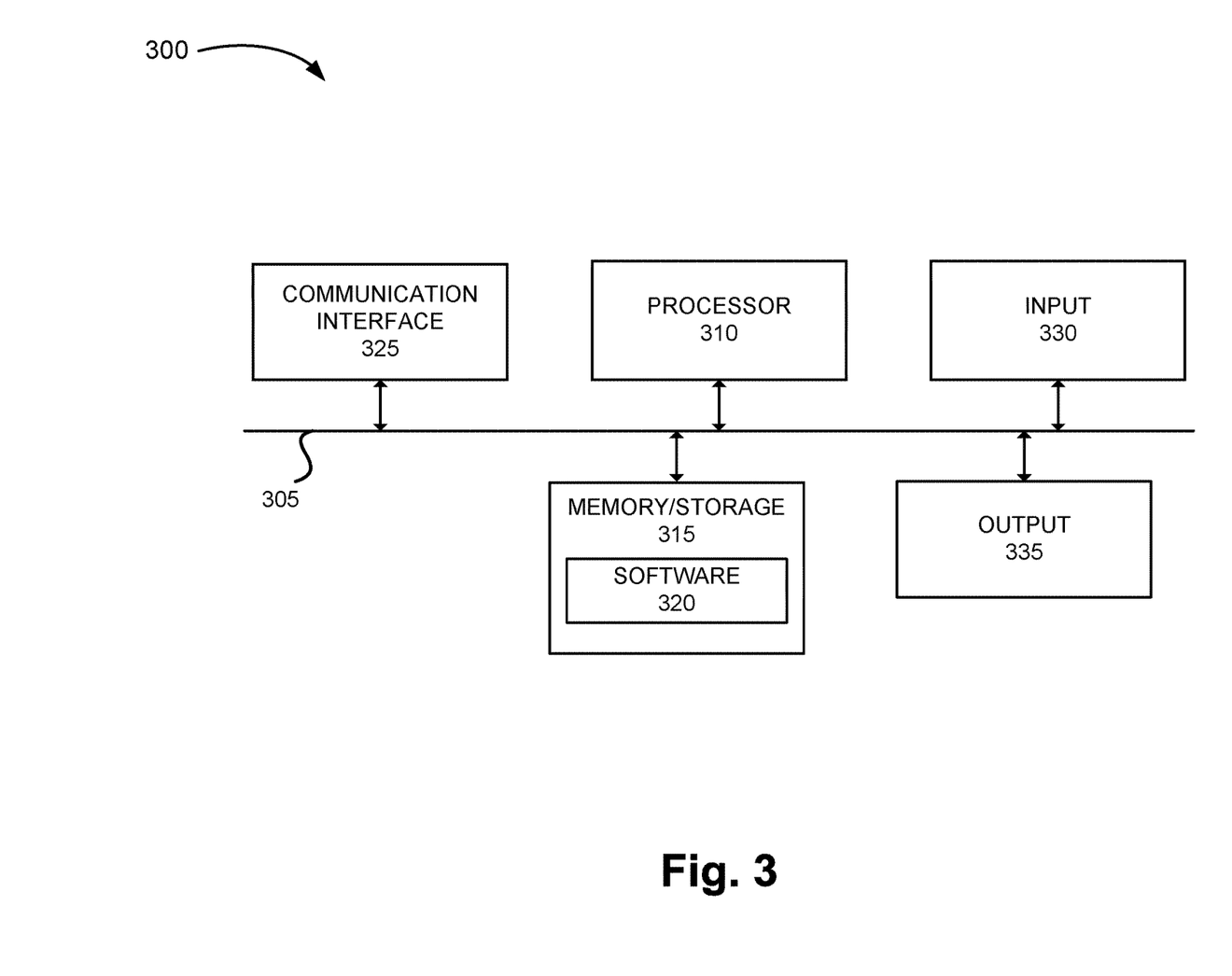
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to components included in packet inspection device 110. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein. Additionally, for example, a component may include a peripheral device in relation to device 300.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a content addressable memory (CAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory (e.g., high bandwidth memory (HBM), stacked memory, hybrid memory, etc.). Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to packet inspection device 110, software 320 may include an application that, when executed by processor 310, provides a function of the packet inspection service, as described herein. Additionally, with reference to virtual machine 205 or container 255, software 320 may include an application that, when executed by processor 310, provides a configured service of the network chain service, as described herein. Software 320 may also include firmware, middleware, microcode, hardware description language (HDL), and/or other form of instruction. Software 320 may further include an operating system (OS) (e.g., Windows, Linux, Android, OpenStack, proprietary, etc.).

Communication interface 325 permits device 300 to communicate with other devices, networks, systems, and/or the like. Communication interface 325 includes one or multiple wireless interfaces, wired interfaces, and/or optical interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.), a network interface card, a port, and/or other type of communication element. Communication interface 325 may be implemented as a point-to-point interface, a service based interface, etc.

Input 330 permits an input into device 300. For example, input 330 may include a keyboard, a mouse, a display, a touchscreen, a touchless screen, a button, a switch, an input port, speech recognition logic, a microphone, an image and/or video capture device, and/or some other type of visual, auditory, tactile, etc., input component. Output 335 permits an output from device 300. For example, output 335 may include a speaker, a display, a touchscreen, a touchless screen, a light, an output port, a speaker, and/or some other type of visual, auditory, tactile, etc., output component.

Device 300 may be instantiated, created, deleted, or in some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
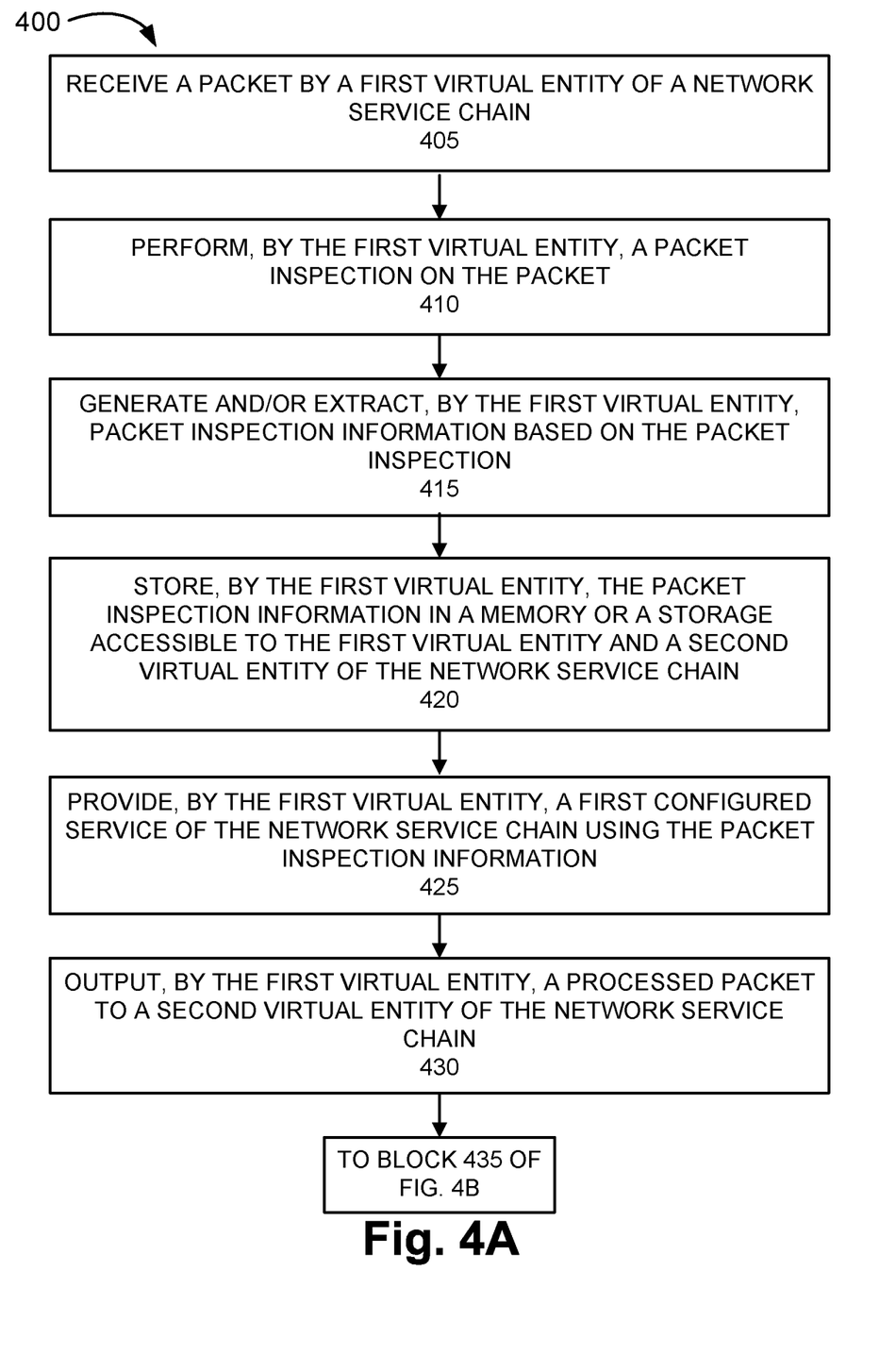
FIGS. 4A and 4B are a flow diagram illustrating an exemplary process of an exemplary embodiment of the packet inspection service.
Figure 4B:
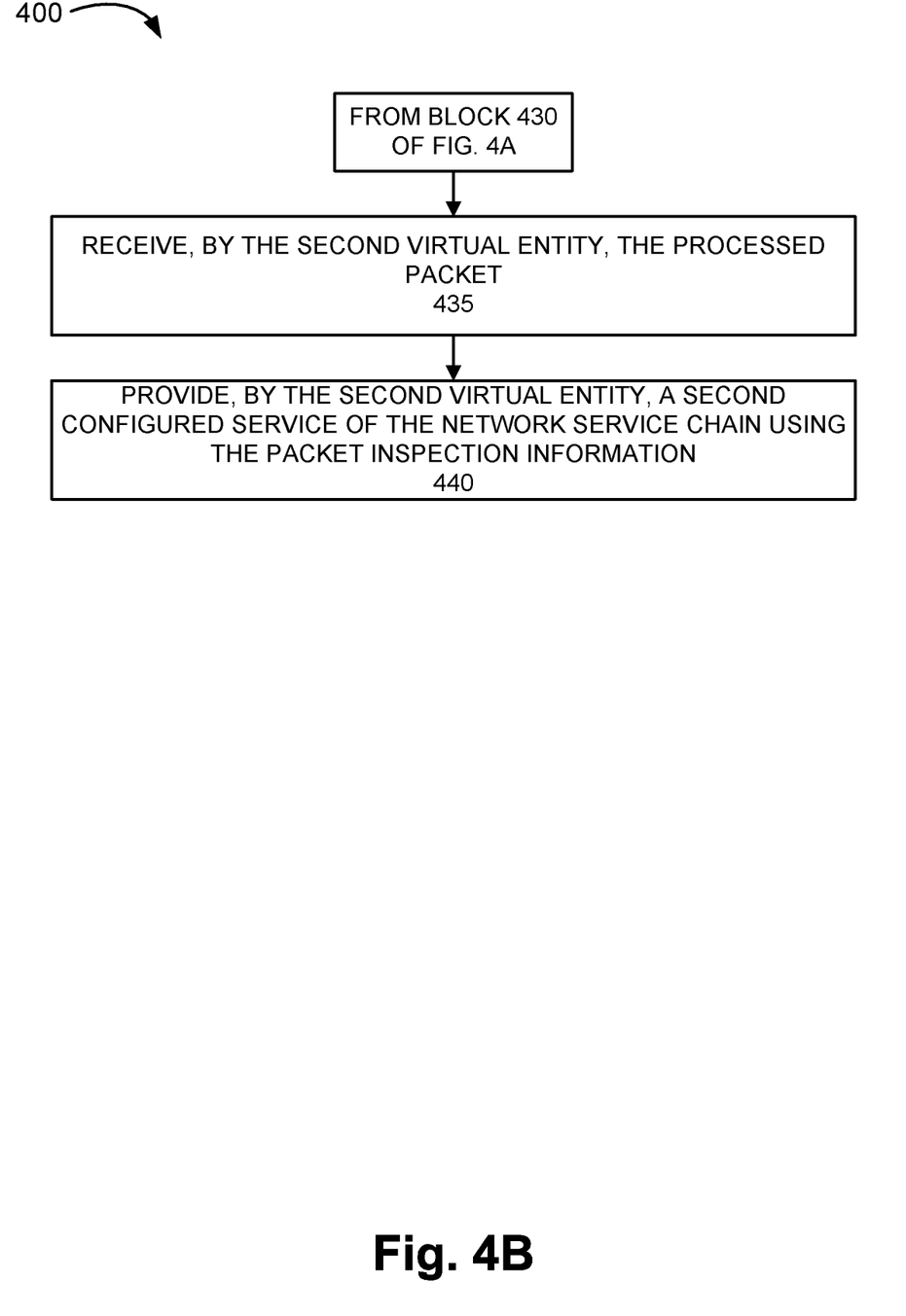

FIGS. 4A and 4B are a flow diagram illustrating an exemplary process 400 of an exemplary embodiment of the packet inspection service. According to an exemplary embodiment, packet inspection device 110, which provides the packet inspection service as described herein, may perform steps of process 400. For example, processor 310 may execute software 320 to perform a step illustrated in FIG. 4, and described herein. Alternatively, for example, a step illustrated in FIG. 4 may be performed by the execution of only hardware.

In the description of process 400, a virtual entity may refer to a virtual machine (e.g., virtual machine 205), a container (e.g., container 255), or another type of virtual element that provides a configured service of a network service chain. Additionally, according to some exemplary embodiments, virtual machine 205 or container 255 may receive control data from other virtual machines 205 or other containers 255 (e.g., secondary agents 220) that indicate the type of packet inspection information used by the other virtual machines 205 or the other containers 255. The control data may indicate certain types of strings, metadata, or other aspects of the inspected data (e.g., structure, format, etc., of the packet inspection information) that would otherwise be obtained by the other virtual machines 205 or the other containers 255 if the other virtual machines 205 or the other containers 255 had performed the performed the packet inspection of the packet, and in turn, enable the other virtual machines 205 or the other containers 255 to provide the configured services of the service chain.

Referring to FIG. 4A, in block 405, a first virtual entity of a network service chain may receive a packet. For example, virtual machine 205 or container 255 may receive an incoming packet via a network device of network 105. For example, the network device may be a router, a gateway, or another type of network device included in network 105.

In block 410, the first virtual entity may perform a packet inspection of the packet. For example, virtual machine 205 or container 255 may perform a deep packet inspection or a deep content inspection of the packet.

In block 415, the first virtual entity may generate and/or extract packet inspection information pertaining to the packet based on the packet inspection. For example, virtual machine 205 or container 255 may generate and/or extract deep packet information or deep content information based on the deep packet inspection.

In block 420, the first virtual entity may store the packet inspection information in a shared memory or storage device that is accessible to the first virtual entity and a second virtual entity of the network service chain. For example, virtual machine 205 or container 255 may store the packet inspection information in shared memory or storage device 235. One or multiple second virtual entities have access to read the packet inspection information from memory or storage device 235.

In block 425, the first virtual entity may provide a first configured service of the network service chain using the packet inspection information. For example, virtual machine 205 or container 255 may perform the first configured service using the packet inspection information. Virtual machine 205 or container 255 may generate a processed packet based on the first configured service.

In block 430, the first virtual entity may output a processed packet to a second virtual entity of the network service chain. For example, virtual machine 205 or container 255 may output the processed packet to another virtual machine 205 or another container 255.

Referring to FIG. 4B, in block 435, the other second virtual entity may receive the processed packet. For example, another virtual machine 205 or another container 255 may receive the processed packet from virtual machine 205 or container 255.

In block 440, the second virtual entity may provide a second configured service of the network service chain using the packet inspection information. For example, the other virtual machine 205 or the other container 255 may access and read shared memory or storage device 235 for the packet inspection information associated with the other virtual machine 205 or the other container 255. The other virtual machine 205 or the other container 255 may provide the second configured service of the network service chain based on the packet inspection information. The other virtual machine 205 or the other container 255 may output the processed packet to yet another virtual machine 205 or container 255, or the processed packet may be output from packet inspection device 110.

FIGS. 4A and 4B illustrate an exemplary process 400 of the packet inspection service, according to other embodiments, process 400 may include additional operations, fewer operations, and/or different operations than those illustrated in FIGS. 4A and 4B, and described herein. For example, according to some exemplary embodiments, one or multiple second virtual entities of the network service chain may not use the packet inspection information to provide a configured service of the network service chain, while one or multiple other second virtual entities may use the packet inspection information to provide a configured service.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. For example, according to other exemplary embodiments, the packet inspection service may be implemented on end device 180.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

In addition, while a series of blocks has been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single or multiple physical memory or storage devices that reside(s) in or is accessible to one or multiple devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a single network device that hosts multiple virtual entities of a service chain, a packet;
performing, by a first virtual entity of the multiple virtual entities, a first packet inspection of the packet that yields all first packet inspection information required by the first virtual entity that provides a first service of the service chain and all second packet inspection information that would otherwise be yielded from one or more second packet inspections subsequently performed by one or multiple other virtual entities of the multiple virtual entities that provide one or multiple second services of the service chain, wherein the first packet inspection information and the second packet inspection information are different, and wherein the first virtual entity performs the first packet inspection based on control data, which is received from the one or multiple other virtual entities, that enables the first virtual entity to yield the second packet inspection information;
storing, by the first virtual entity based on the performing, the first packet inspection information and the second packet inspection information in a memory or storage device of the single network device that is accessible to the one or multiple other virtual entities of the multiple virtual entities;

providing, by the first virtual entity, the first service of the service chain on the packet using the first packet inspection information; and outputting, by the first virtual entity based on the first service, a processed packet to a second virtual entity of the multiple virtual entities.

2. The method of claim 1, further comprising:
receiving, by the second virtual entity, the processed packet;
reading, by the second virtual entity, the second packet inspection information from the memory or the storage device; and
providing, by the second virtual entity based on the reading, a second service of the one or multiple second services of the service chain on the processed packet.

3. The method of claim 1, wherein the performing comprises:
performing, by the first virtual entity, deep packet inspection of the packet.

4. The method of claim 1, further comprising:
allocating, by a controller of the multiple virtual entities, the memory or storage device for use by the multiple virtual entities.

5. The method of claim 1, wherein the first virtual entity has write and read permissions for the memory or storage device, and wherein the one or multiple other virtual entities of the multiple virtual entities have read permission and do not have write permission for the memory or storage device.

6. The method of claim 1, further comprising:
receiving, by the first virtual entity from the second virtual entity, first control data of the control data that enables execution of a type of packet inspection used by the second virtual entity, which is different from a type of packet inspection used by the first virtual entity, wherein the first control data includes executable instructions; and the performing further comprising:
performing, by the first virtual entity, the first packet inspection of the packet based on the first control data.

7. The method of claim 1, wherein the first packet inspection information includes at least one of deep packet inspection information or deep content inspection information.

8. The method of claim 1, wherein the first virtual entity and the second virtual entity include virtual machines or containers.

9. A network device comprising:
a communication interface;
a first memory or a first storage device;
an element that hosts multiple virtual entities of a service chain;
a second memory, wherein the second memory stores instructions; and
a processor, wherein the processor executes the instructions to:
receive, via the communication interface, a packet, wherein the network device is a single network device;
perform, by a first virtual entity of the multiple virtual entities, a first packet inspection of the packet that yields all first packet inspection information required by the first virtual entity that provides a first service of the service chain and all second packet inspection information that would otherwise be yielded from one or more second packet inspections subsequently performed by one or multiple other virtual entities of the multiple virtual entities that provide one or multiple second services of the service chain, wherein the first packet inspection information and the second packet inspection information are different, and wherein the first virtual entity performs the first packet inspection based on control data, which is received from the one or multiple other virtual entities, that enables the first virtual entity to yield the second packet inspection information;

store, by the first virtual entity based on the performance of the first packet inspection, the first packet inspection information and the second packet inspection information in the first memory or the first storage device of the single network device that is accessible to the one or multiple other virtual entities of the multiple virtual entities;

provide, by the first virtual entity, the first service of the service chain on the packet using the first packet inspection information; and output, by the first virtual entity based on the first service, a processed packet to a second virtual entity of the multiple virtual entities.

10. The network device of claim 9, wherein the processor further executes the instructions to:
receive, by the second virtual entity, the processed packet;
read, by the second virtual entity, the second packet inspection information from the first memory or the first storage device; and
provide, by the second virtual entity based on the read second packet inspection information, a second service of the one or multiple second services of the service chain on the processed packet.

11. The network device of claim 9, wherein, when performing the packet inspection, the processor further executes the instructions to:
perform, by the first virtual entity, deep packet inspection of the packet.

12. The network device of claim 9, further comprising a controller of the multiple virtual entities, wherein the processor further executes the instructions to:
allocate, by the controller, the first memory or the first storage device for use by the multiple virtual entities.

13. The network device of claim 9, wherein the first virtual entity has write and read permissions for the first memory or the first storage device, and wherein the one or multiple other virtual entities of the multiple virtual entities have read permission and do not have write permission for the first memory or the first storage device.

14. The network device of claim 9, wherein the processor further executes the instructions to:
receive, by the first virtual entity from the second virtual entity, first control data of the control data that enables execution of a type of packet inspection used by the second virtual entity, which is different from a type of packet inspection used by the first virtual entity, wherein the first control data includes executable instructions; and wherein, when performing the packet inspection, the processor further executes the instructions to:
perform, by the first virtual entity, the first packet inspection of the packet based on the first control data.

15. The network device of claim 9, wherein the first packet inspection information includes at least one of deep packet inspection information or deep content inspection information, and wherein the first virtual entity and the second virtual entity include virtual machines or containers.

16. A non-transitory computer-readable storage medium storing instructions executable by a processor of a single network device that hosts multiple virtual entities, which when executed cause the network device to:
- receive a packet;
- perform, by a first virtual entity of the multiple virtual entities of a service chain of the network device, a first packet inspection of the packet that yields all first packet inspection information required by the first virtual entity that provides a first service of the service chain and all second packet inspection information that would otherwise be yielded from one or more second packet inspections performed by one or multiple other virtual entities of the multiple virtual entities that provide one or multiple second services of the service chain, wherein the first packet inspection information and the second packet inspection information are different, and wherein the first virtual entity performs the first packet inspection based on control data, which is received from the one or multiple other virtual entities, that enables the first virtual entity to yield the second packet inspection information;
- store, by the first virtual entity based on the performance of the first packet inspection, the first packet inspection information and the second packet inspection information in a first memory or a first storage device of the single network device that is accessible to the one or multiple other virtual entities of the multiple virtual entities;
- provide, by the first virtual entity, the first service of the service chain on the packet using the first packet inspection information; and
- output, by the first virtual entity based on the first service, a processed packet to a second virtual entity of the multiple virtual entities.

17. The non-transitory computer-readable storage medium of claim 16, wherein the instructions further comprise instructions executable by the processor, which when executed cause the network device to:
- receive, by the second virtual entity, the processed packet;
- read, by the second virtual entity, the second packet inspection information from the first memory or the first storage device; and
- provide, by the second virtual entity based on the read second packet inspection information, a second service of the one or multiple second services of the service chain on the processed packet.

18. The non-transitory computer-readable storage medium of claim 16, wherein the first virtual entity has write and read permissions for the first memory or the first storage device, and wherein the one or multiple other virtual entities of the multiple virtual entities have read permission and do not have write permission for the first memory or the first storage device.

19. The non-transitory computer-readable storage medium of claim 16, wherein the instructions further comprise instructions executable by the processor, which when executed cause the network device to:
- receive, by the first virtual entity from the second virtual entity, first control data of the control data that enables execution of a type of packet inspection used by the second virtual entity, which is different from a type of packet inspection used by the first virtual entity, wherein the first control data includes executable instructions; and wherein the instructions to perform the first packet inspection, further comprise instructions executable by the processor, which when executed cause the network device to:
- perform, by the first virtual entity, the first packet inspection of the packet based on the first control data.

20. The non-transitory computer-readable storage medium of claim 16, wherein the first packet inspection information includes at least one of deep packet inspection information or deep content inspection information, and wherein the first virtual entity and the second virtual entity include virtual machines or containers.

* * * * *